(12) United States Patent
Aradachi et al.

(10) Patent No.: US 8,344,696 B2
(45) Date of Patent: Jan. 1, 2013

(54) BATTERY CHARGER INCLUDING A COMPARATOR

(75) Inventors: Takao Aradachi, Ibaraki (JP);
Kazuhiko Funabashi, Ibaraki (JP)

(73) Assignee: Hitachi Koko Co., Ltd., Tokyo (JP)

( * ) Notice: Subject to any disclaimer, the term of this patent is extended or adjusted under 35 U.S.C. 154(b) by 856 days.

(21) Appl. No.: 12/281,233

(22) PCT Filed: Mar. 2, 2007

(86) PCT No.: PCT/JP2007/054595
§ 371 (c)(1),
(2), (4) Date: Aug. 29, 2008

(87) PCT Pub. No.: WO2007/102592
PCT Pub. Date: Sep. 13, 2007

(65) Prior Publication Data
US 2009/0033291 A1   Feb. 5, 2009

(30) Foreign Application Priority Data
Mar. 2, 2006   (JP) .................................. 2006-055639

(51) Int. Cl.
H02J 7/04   (2006.01)
H02J 7/16   (2006.01)
(52) U.S. Cl. ........ 320/150; 320/134; 320/149; 320/163; 320/164; 320/151
(58) Field of Classification Search ................. 320/134, 320/159, 149, 163, 164, 151
See application file for complete search history.

(56) References Cited

U.S. PATENT DOCUMENTS

| | | | |
|---|---|---|---|
| 3,477,009 A * | 11/1969 | Nichols .......................... | 320/163 |
| 3,794,905 A * | 2/1974 | Long .............................. | 320/161 |
| 3,838,327 A * | 9/1974 | Uemichi et al. ............... | 320/138 |
| 3,992,658 A * | 11/1976 | Bechtold et al. ............... | 320/161 |
| 4,065,712 A * | 12/1977 | Godard et al. ................. | 320/144 |
| 5,705,911 A * | 1/1998 | Tamai ............................ | 320/134 |
| 5,777,457 A * | 7/1998 | Lee ................................ | 320/137 |
| 6,118,250 A * | 9/2000 | Hutchison et al. ............ | 320/110 |
| 6,208,117 B1 * | 3/2001 | Hibi ............................... | 320/134 |
| 6,307,353 B1 * | 10/2001 | Shiojima ........................ | 320/139 |
| 6,351,110 B1 * | 2/2002 | Pappalardo et al. .......... | 323/285 |

(Continued)

FOREIGN PATENT DOCUMENTS
EP   0820138 A2   1/1998
(Continued)

*Primary Examiner* — Timothy J Dole
*Assistant Examiner* — Lamarr Brown
(74) *Attorney, Agent, or Firm* — McDermott Will & Emery LLP

(57) ABSTRACT

A charging signal Vi responding to a charging current is inputted to one input terminal (−) of an operational amplifier 95 forming a comparator and a setting signal Vr corresponding to a setting current value is inputted to the other input terminal (+) of the operational amplifier 95. When the charging signal Vi is not higher than the setting signal Vr, a charging stop signal is generated from the output terminal of the operational amplifier 95 to interrupt a switch unit 4. A starting signal Vcc larger than the setting signal Vr applied to the other input terminal (+) is applied to the one input terminal (−) of the operational amplifier 95 through a condenser 94 till a prescribed time elapses from the start of a charging operation to generate a charging start signal from the output terminal of the operational amplifier 95 and electrically conduct the switch unit 4.

12 Claims, 3 Drawing Sheets

U.S. PATENT DOCUMENTS

| | | | | |
|---|---|---|---|---|
| 6,522,104 | B1* | 2/2003 | Drori | 320/149 |
| 6,992,464 | B2* | 1/2006 | Takano et al. | 320/150 |
| 7,378,819 | B2* | 5/2008 | Wang et al. | 320/121 |
| 7,405,539 | B2* | 7/2008 | Chen | 320/162 |
| 7,541,773 | B2* | 6/2009 | Funabashi et al. | 320/114 |
| 7,551,003 | B2* | 6/2009 | Sobue | 327/66 |
| 7,567,062 | B2* | 7/2009 | Wong et al. | 320/162 |
| 7,592,780 | B2* | 9/2009 | Funabashi et al. | 320/152 |
| 8,035,350 | B2* | 10/2011 | Aradachi et al. | 320/152 |
| 2004/0075417 | A1* | 4/2004 | Aradachi et al. | 320/107 |
| 2004/0232892 | A1* | 11/2004 | Aradachi et al. | 320/150 |
| 2005/0017691 | A1* | 1/2005 | Aradachi et al. | 320/150 |
| 2005/0258805 | A1* | 11/2005 | Thomas et al. | 320/134 |
| 2006/0220620 | A1* | 10/2006 | Aradachi et al. | 320/150 |
| 2006/0255771 | A1* | 11/2006 | Sakakibara | 320/150 |
| 2007/0273332 | A1* | 11/2007 | Funabashi et al. | 320/134 |
| 2008/0136264 | A1* | 6/2008 | Yoshida et al. | 307/80 |
| 2008/0180065 | A1* | 7/2008 | Aradachi et al. | 320/152 |
| 2009/0027011 | A1* | 1/2009 | Umetsu | 320/145 |
| 2009/0058363 | A1* | 3/2009 | Platania et al. | 320/134 |
| 2009/0102428 | A1* | 4/2009 | Aradachi et al. | 320/153 |

FOREIGN PATENT DOCUMENTS

JP  2-192670  7/1990

* cited by examiner

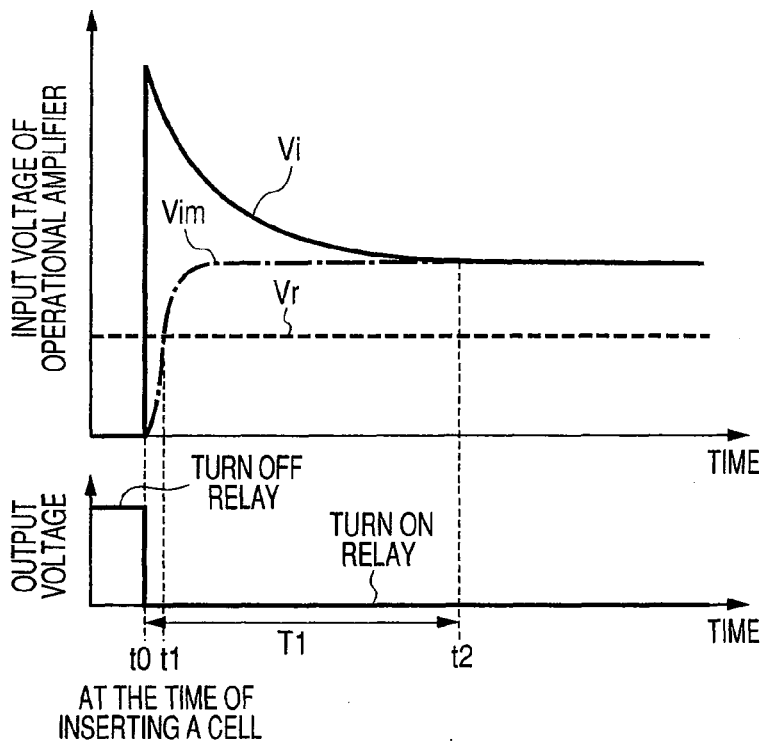
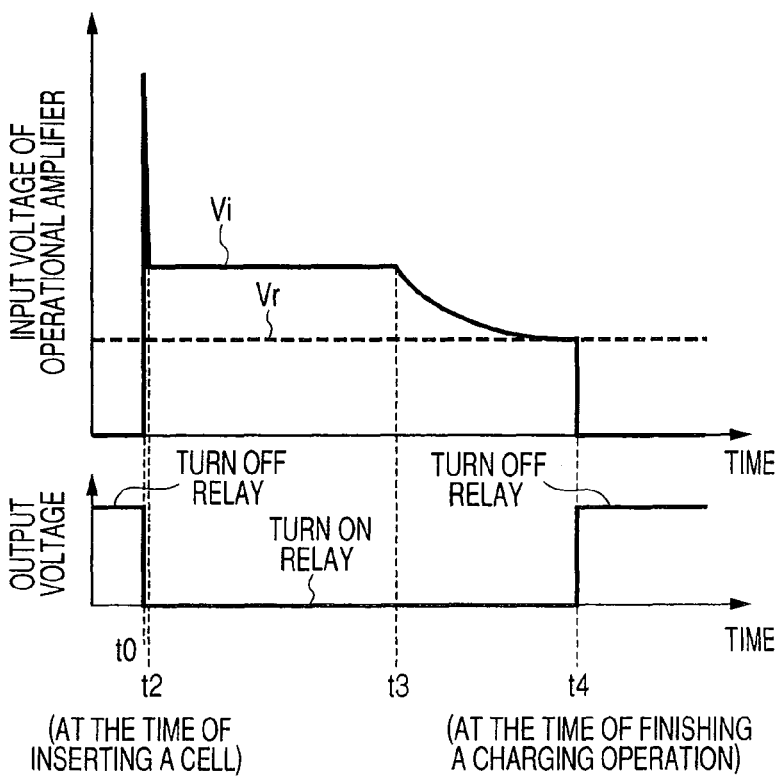

BATTERY CHARGER INCLUDING A COMPARATOR

TECHNICAL FIELD

The present invention relates to a battery charger of a secondary battery, and more particularly to a battery charger for charging a battery pack that requires a constant current/constant voltage control system such as a lithium battery (including a lithium ion cell).

BACKGROUND ART

As a power source for driving a cordless electric tool, used is a secondary cell having a capacity relatively increased such as a nickel hydrogen battery or a NiCd battery. As the secondary cell having a capacity more increased and a weight more decreased, a lithium cell including a lithium ion cell has been progressively practically used.

The lithium battery has a performance that the nominal voltage of the cell is about three times as high as that of the nickel hydrogen battery or the NiCd battery widely put to practical use, and the energy density thereof is about three times as high as the NiCd battery and a feature that the battery is compact and light. Further, the lithium battery has features that the battery has good discharge efficiency, the battery can be discharged even in an environment of relatively low temperature and the battery can obtain a stable voltage in a wide range of temperature.

The lithium battery (battery pack) is ordinarily charged under a constant current/constant voltage control as shown in a charging characteristic view of FIG. 4. However, it is generally known that to overcharge the battery under the constant current/constant voltage control is undesirable in view of the characteristics or the life of the battery. Accordingly, for instance, as disclosed in JP-A-2-192670, a method is proposed that while a battery is charged under a constant voltage, the charging current of a charging power circuit is detected, and when the charging current is lowered to a value not higher than a prescribed value, the battery is decided to be fully charged to generate a charging stop signal, interrupt a charging path of the charging power circuit and finish a charging operation.

DISCLOSURE OF INVENTION

In the above-described constant current/constant voltage control, when the fully charged state of the battery is detected to control the charging operation, as a relatively simple control circuit system, a system may be considered in which a voltage comparator composed of an operational amplifier is provided, the value of a charging current during charging a battery under a constant voltage is converted to a voltage value, the voltage value is inputted to one signal input terminal and compared with a reference value (converted into a voltage value) of a current during fully charging the battery previously set to the other comparing input terminal of the operational amplifier, and when the voltage value exceeds the reference value, a switch unit of a charging path is turned on to charge the battery, and when the voltage value is not higher than the reference value, the switch unit of the charging path is turned off to stop the charging operation. However, in such a control circuit system, the charging current before the charging operation does not flow to have zero ampere. Thus, the input of a signal of the voltage comparator is not higher than the reference value so that the charging operation cannot be started. Therefore, even when the voltage comparator is simply provided, the battery cannot be charged. Further, a method may be considered that a microcomputer is provided to monitor the charging current. However, since the microcomputer is more expensive than other parts such as a resistance, a production cost of a battery charger is high.

Accordingly, it is an object of the present invention to provide an inexpensive battery charger that can assuredly discriminate whether or not a battery is fully charged in the battery charger for charging a secondary battery (battery pack) such as a lithium battery under a constant current/constant voltage control system.

It is another object of the present invention to provide a battery charger that can assuredly discriminate whether or not a battery is fully charged by a relatively simple circuit.

Representative features of the present invention disclosed to solve the above-described problems will be described below.

According to one feature of the present invention, a battery charger constructed so that a charging current signal is compared with a setting signal by a comparator and the comparator generates a charging stop signal when the charging current signal is not higher than the setting signal and a signal not lower than the setting signal is applied to a terminal of the comparator to which the charging current signal is inputted until a prescribed time elapses from the start of a charging operation.

According to another feature of the present invention, the charging current signal is voltage corresponding to a charging current and the setting signal is voltage corresponding to a setting charging current during a fully charging operation.

According to a still another feature of the present invention, the signal not lower than the setting signal is a starting voltage for starting a charging operation.

According to a still another feature of the present invention, a secondary battery to be charged is charged by a charging power circuit through a switch unit and a charging stop signal is generated when the value of a charging current is not higher than the value of a corresponding setting current during a fully charging operation to interrupt the switch unit. The battery charger comprises a comparator having a pair of comparing signal input terminals and an output terminal whose output signal level is inverted in response to an input signal applied to the pair of signal input terminals. A charging signal responding to the charging current is inputted to one input terminal of the comparator and a setting signal corresponding to the setting current value is inputted to the other input terminal of the comparator, and when the charging signal applied to the one input terminal during the fully charging operation is not higher than the setting signal, the charging stop signal is generated from the output terminal of the comparator to interrupt the switch unit, and further, a starting signal larger than the setting signal applied to the other input terminal is applied to the one input terminal of the comparator till a prescribed time elapses from the start of a charging operation to generate a charging start signal from the output terminal of the comparator and electrically conduct the switch unit.

According to a still another feature of the present invention, the comparator is formed with a voltage comparator, the charging signal indicates a voltage responding to the charging current, the setting signal indicates a voltage corresponding to the setting current value during the fully charging operation and the charging start signal or the charging stop signal indicates an output voltage of the comparator.

According to a still another feature of the present invention, the battery charger further comprises a battery temperature detecting unit for detecting the battery temperature of the secondary battery to be charged. When the cell temperature detected by the cell temperature detecting unit is located within a prescribed temperature range, the starting signal is applied to the one input terminal of the comparator for a prescribed time after the secondary battery to be charged is inserted into the battery charger.

According to a still another feature of the present invention, the one input terminal of the comparator is connected to a voltage source having a prescribed voltage through a starting voltage applying unit to apply the starting signal of the prescribed voltage to the one input terminal of the comparator from the voltage source through the starting voltage applying unit.

According to a still another feature of the present invention, the starting voltage applying unit is formed with a condenser.

According to a still another feature of the present invention, the comparator is formed with an operational amplifier.

According to a still another feature of the present invention, the switch unit is formed with a relay switch and a switch control circuit including a control coil of the relay switch is controlled by the charging start signal or the charging stop signal.

According to a further feature of the present invention, the secondary battery to be charged is a lithium battery charged by a constant current/constant voltage control.

According to the battery charger of the present invention, since the charging start signal or the charging stop signal for controlling the switch unit inserted into the charging power circuit is generated by the comparator, whether or not the battery is fully charged can be assuredly discriminated under a constant current/constant voltage control by a relatively simple and inexpensive control circuit.

The above-described and other objects of the present invention and the above-described and other features and advantages will be more apparent from the following description of the specification and the attached drawings.

BRIEF DESCRIPTION OF THE DRAWINGS

FIGS. 2A, 2B are operational characteristic views at the time of starting a charging operation of a full-charge detecting circuit forming the battery charger shown in FIG. 1.

FIGS. 3A, 3B are operational characteristic views at the time of finishing the charging operation of the full-charge detecting circuit forming the battery charger shown in FIG. 1.

BEST MODE OF CARRYING OUT OF THE INVENTION

Now, an embodiment of the present invention will be described in detail by referring to FIGS. 1 to 3.

Figure 1:
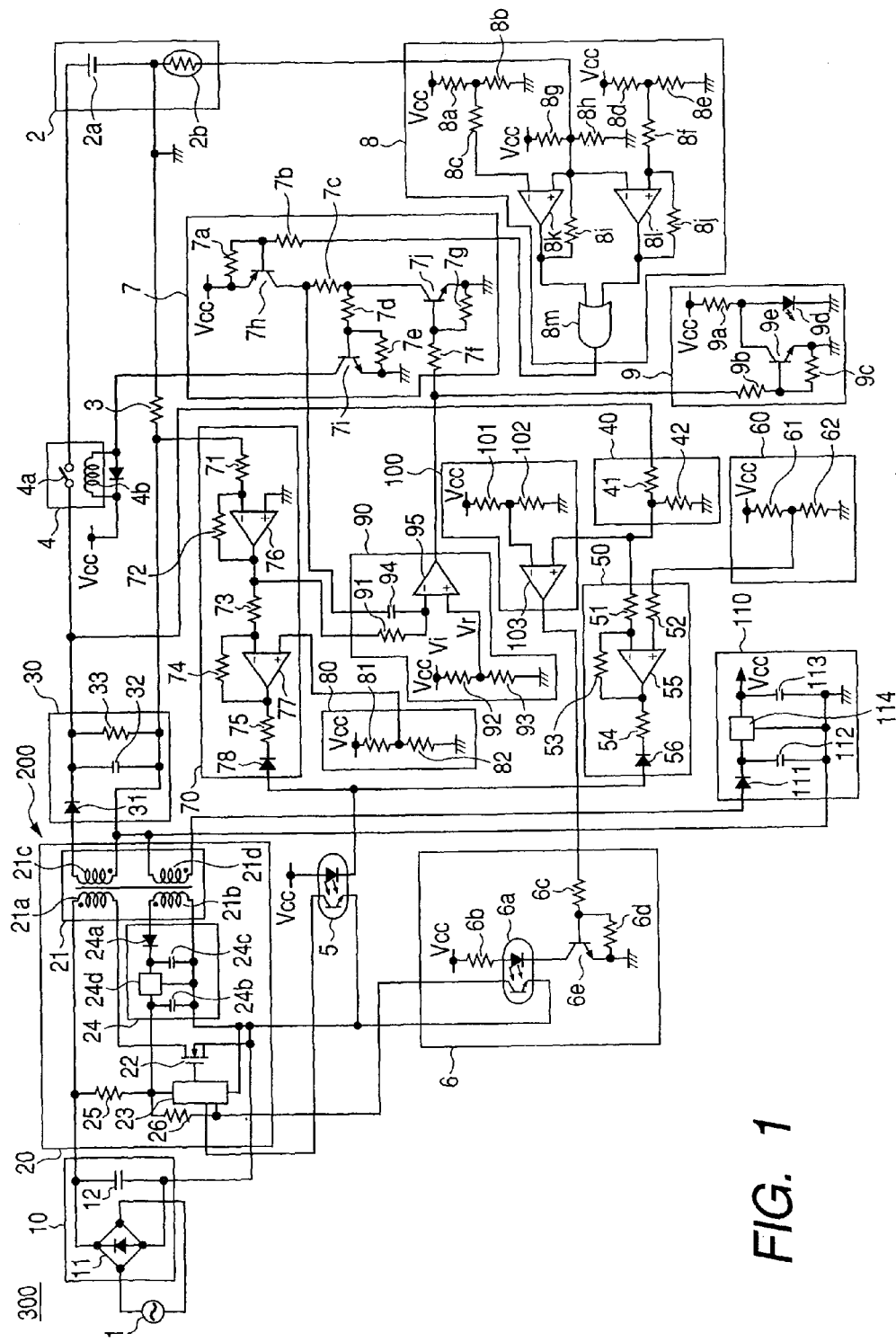
FIG. 1 is a circuit diagram of a battery charger according to an embodiment of the present invention.
Figure 4:
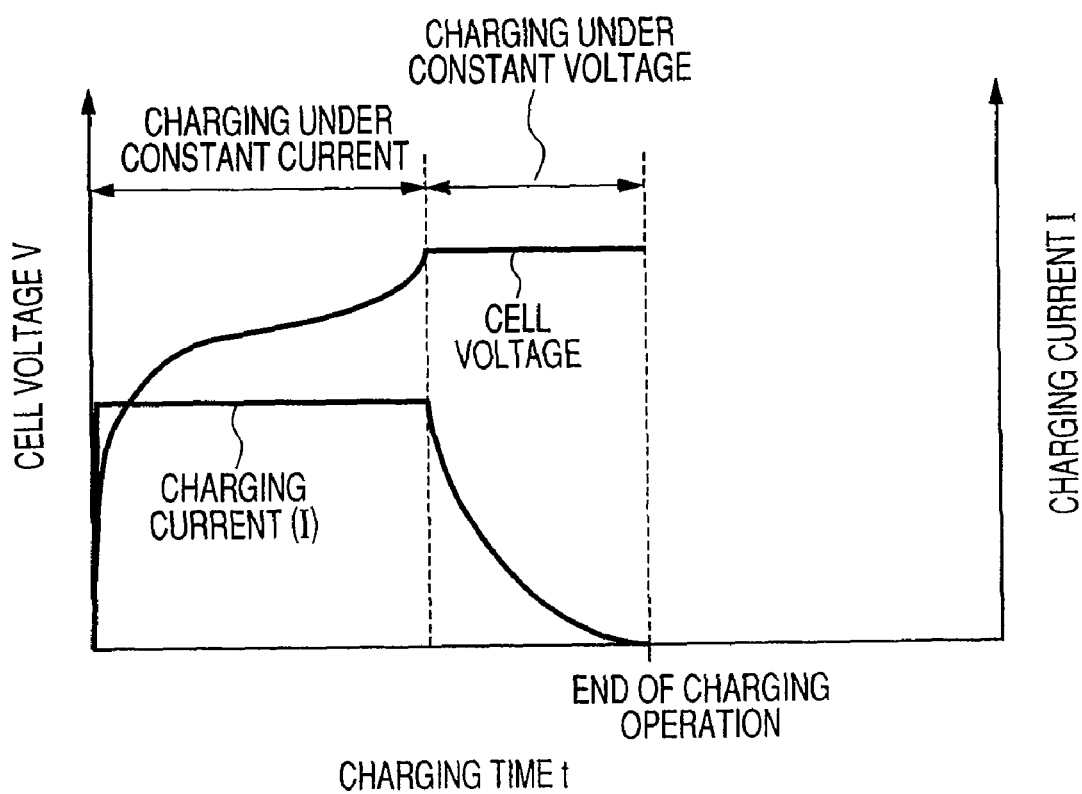
FIG. 4 is a charging characteristic view showing a constant current/constant voltage charging control.

FIG. 1 shows a circuit diagram of a battery charger 300 according to one embodiment of the present invention. In FIG. 1, a battery pack (a secondary battery) 2 to be charged by the battery charger 300 includes a single or a plurality of, for instance, lithium battery cells 2a connected in series that can be charged, and a temperature sensing element 2b functioning as a temperature detecting sensor such as a thermistor arranged in contact with or closely to the battery cell 2a. For instance, in the battery pack 2 of this embodiment, the battery cell 2a is composed of one lithium ion battery (nominal voltage of 3.6 V). As the temperature sensing element 2b, the thermistor is used.

A charging power circuit 200 for supplying a charging electric power to the battery pack 2 is formed with a switching power circuit including a primary side rectifying and smoothing circuit 10, a switching circuit 20 including a high frequency transformer 21 and a secondary side rectifying and a smoothing circuit 30.

The primary side rectifying and smoothing circuit 10 includes a full-wave rectifying circuit 11 and a smoothing condenser 12, and full-wave rectifies an ac power source 1 such as a commercial ac power source.

The switching circuit 20 includes the high frequency transformer 21, a MOSFET (a switching element) 22 connected in series to the primary winding 21a of the transformer 21 and a PWMIC (a switching control IC) 23 for modulating a pulse width of a driving pulse signal applied to the gate electrode of the MOSFET 22.

A driving power of the PWMIC 23 is supplied from a constant voltage circuit 24 formed in the secondary winding 21b of the transformer 21. The constant voltage circuit 24 includes a rectifying diode 24a, a three-terminal regulator 24d, a condenser 24c connected to an input side of the three-terminal regulator 24d and a condenser 24b connected to an output side of the three-terminal regulator 24d. To the PWMIC 23, a charging voltage control signal and a charging current control signal are fed back from the secondary side rectifying and smoothing circuit 30 by a charging feedback signal transmitting unit 5 composed of a photo-coupler. Further, to the PWMIC 23, a switching stop control signal is fed back by a photo-coupler 6a forming a below-described switching stop circuit 6. The PWMIC 23 controls the start and stop of the charging operation of the MOSFET 22 by a control input signal from the photo-coupler 6a and changes a driving pulse width supplied to the gate electrode of the MOSFET 22 by a control input signal from the photo-coupler 5 to control the turning on time of the MOSFET 22 and adjust the output voltage of the secondary side rectifying and smoothing circuit 30 and the charging current of the battery pack 2. To the PWMIC 23, the output voltage of the primary side rectifying and smoothing circuit 10 is supplied through a starting resistance 25 during starting. Further, to the PWNIC 23 to which the switching stop control signal from the photo-coupler 6a, a pull-up resistance 26 is connected. Under a state that the switching transistor 6e of the below-described switching stop circuit 6 is turned off, an operating potential is applied to the PWMIC 23 by the pull-up resistance 26.

The secondary side rectifying and smoothing circuit 30 includes a diode 31 connected to a tertiary winding 21c of the transformer 21, a smoothing condenser 32 and a discharging resistance 33.

In a quarterly winding 21d of the transformer 21, a constant voltage power source 110 for a control circuit for supplying the power Vcc of below-described various kinds of control circuits is formed. The constant voltage power source 110 for the control circuit includes a rectifying diode 111, a three-terminal regulator 114, a condenser 112 connected to an input side of the three-terminal regulator 114 and a condenser 113 connected to an output side of the three-terminal regulator 114 to output a constant voltage Vcc.

The primary side rectifying and smoothing circuit 10, the switching circuit 20 and the secondary side rectifying and smoothing circuit 30 form the charging power circuit 200. Between the output side of the charging power circuit 200 and the battery pack 2, a switch unit 4 for controlling a charging path to be opened and closed (on and off) is electrically connected. The switching unit 4 is formed with, for instance, a relay, and includes a relay switch 4a and a control coil 4b. The control coil 4b is controlled by a relay control circuit 7.

The relay control circuit 7 includes a transistor 7h controlled to be turned on and off by the output of a below-described cell temperature detecting circuit 8, an output transistor 7i whose base is connected to the collector side of the transistor 7h, and a transistor 7j controlled to be turned on and off by the output of a below-described full-charge detecting circuit 90 and connected in series to the transistor 7h, and has resistances 7a to 7g provided in association with the transistors 7h, 7i and 7j.

A charging current control circuit 70 includes an operational amplifying circuit having an operational amplifiers 76 and 77, input resistances 71 and 73 of the operational amplifiers 76 and 77, feedback resistances 72 and 74 of the operational amplifiers 76 and 77 and an output circuit including a diode 78 and a current limiting resistance 75. To one input terminal (+) of the operational amplifier 77, a charging current setting circuit 80 having voltage dividing resistances 81 and 82 is connected and the reference value of a charging current is set by the voltage dividing ratio of the resistances 81 and 82. To the voltage dividing resistances 81 and 82 for supplying a setting potential, the output voltage Vcc of the constant voltage power source 110 for the control circuit is fed. An input side of the charging current control circuit 70 is connected to a charging current detecting resistance 3 for detecting the charging current of the battery pack 2. Further, the output side thereof controls the PWMIC 23 through the charging feedback signal transmitting unit 5 composed of the photo-coupler as described above.

In such a charging current control circuit 70, a voltage drop based on the charging current supplied to the charging current detecting resistance 3 is inverted and amplified by the resistances 71 and 72 and the operational amplifier 76 to amplify the difference between an output voltage thereof and a charging current setting reference voltage set by the charging current setting circuit 80 by the operational amplifier 77, feed back the amplified voltage to the PWMIC 23 through the charging feedback signal transmitting unit 5 and control the switching operation of the MOSFET 22. That is, when the charging current supplied to the charging current detecting resistance 3 is larger than a prescribed charging current, the MOSFET 22 applies an output pulse whose pulse width is narrowed to the high frequency transformer 21. On the contrary, when the charging current is smaller than the prescribed charging current, the MOSFET 22 applies the pulse whose pulse width is widened to the high frequency transformer 21. Thus, the secondary side rectifying and smoothing circuit 30 smoothes a dc voltage corresponding to the prescribed charging current to maintain the charging current of the battery pack 2 to the prescribed current set by the charging current setting circuit 80. In other words, the charging current is controlled to have the setting current value by the current detecting resistance 3, the charging current control circuit unit 70, the charging feedback signal transmitting unit 5, the switching circuit 20 and the secondary side rectifying and smoothing circuit 30.

An output voltage control circuit 50 includes an operational amplifier 55, an input resistance 51 of an inverse input terminal (−) side, a feedback resistance 53, an input resistance 52 of a non-inverse input terminal (+) side, and an output circuit having a diode 56 and a current limiting resistance 54. The inverse input terminal (−) side of the output voltage control circuit 50 is connected to an output voltage detecting circuit 40 of a charging power source including a resistance 41 and a resistance 42, and a detected voltage for feeding back of the output voltage of the charging power circuit 200 is inputted thereto. On the other hand, the non-inverse input terminal (+) side is connected to an output voltage setting circuit 60 having voltage dividing resistances 61 and 62 for dividing a supply voltage Vcc to set a prescribed voltage for a constant voltage charging operation. In this embodiment, since the battery pack 2 is composed of one lithium ion battery, an output voltage may be set to, for instance, 4.2 V. The output side of the output voltage control circuit 50 is connected to the PWMIC 23 through the charging feedback signal transmitting unit 5 composed of the photo-coupler like the output side of the charging current control circuit 70. In such a structure, the difference between a detected output voltage from the output voltage detecting circuit 40 and a setting reference voltage from the output voltage setting circuit 60 is amplified to feed back the amplified voltage to the PWMIC 23 through the charging feedback signal transmitting unit 5 and control the output voltage to a prescribed value. Accordingly, the PWMIC 23 is controlled by the output signal (the feedback signal) of the charging current control circuit 70 or the output voltage control circuit 50.

The cell temperature detecting circuit 8 is a cell temperature detecting unit for operating the battery charger 300 only when the temperature of the battery pack 2 is located within a prescribed temperature range (for instance, −5° C. to 50° C.) and includes a window comparator (a voltage comparator) using an OR gate as described below. Specifically, the cell temperature detecting circuit 8 includes a first voltage comparator having an operational amplifier 8k, a feedback resistance 8i and an input resistance 8c and a second voltage comparator including an operational amplifier 8l, a feedback resistance 8j and an input resistance 8f. To the reference input terminal (−) of the operational amplifier 8k forming the first comparator, a reference voltage (a lower limit reference signal) corresponding to a lower limit temperature (−5° C.) obtained by dividing the supply voltage Vcc by voltage dividing resistances 8a and 8b is applied. To the reference input terminal (+) of the operational amplifier 8l forming the second voltage comparator, a reference voltage (an upper limit reference signal) corresponding to an upper limit temperature (50° C.) obtained by dividing the supply voltage Vcc by voltage dividing resistances 8d and 8e is applied. Further, to the signal input terminal (+) of the operational amplifier 8k and the signal input terminal (−) of the operational amplifier 8l, a voltage change based on the change of a resistance value of the temperature sensing element 2b relative to temperature is inputted through a voltage dividing circuit having the supply voltage Vcc and resistances 8g and 8h. Both the output signals of the operational amplifiers 8k and 8l are inputted to an OR gate 8m. The OR output of the OR gate 8m is inputted to the base of the transistor 7h of the relay control circuit 7 through the resistance 7b. The operation of the relay control circuit 7 can be controlled within the temperature range (−5° C. to 50° C.) where the battery pack 2 is permitted to be charged by the cell temperature detecting circuit 8.

An LED (a light emitting diode) display circuit 9 is a monitor circuit for allowing a user to recognize the start or the end of a charging operation and includes a displaying LED 9d, a driving transistor 9e and a resistances 9a to 9c. For instance, the displaying LED 9d is controlled to be turned on during the charging operation and turned off during finishing the charging operation.

An over-voltage detecting circuit 100 includes an operational amplifier 103 functioning as a voltage comparator and voltage dividing resistances 101 and 102 connected to one input terminal (−) of the operational amplifier 103 to set a voltage corresponding to an over-voltage. To the other input terminal (+) of the operational amplifier 103, divided voltage obtained by dividing the output voltage of the secondary side rectifying and smoothing circuit 30 by the resistances 41 and 42 of the output voltage detecting circuit 40 is inputted. The output of the over-voltage detecting circuit 100 is connected to the switching stop circuit 6.

The switching stop circuit 6 is provided to stop the operation of the PWMIC 23 in response to a signal from the over-voltage detecting circuit 100 and includes a photo-coupler 6a, resistances 6b to 6d and a switching transistor 6e.

The full-charge detecting circuit 90 includes an operational amplifier 95 functioning as a voltage comparator, resistances 91 to 93 and a condenser 94. To one input terminal (+) of the operational amplifier 95, a reference voltage (a setting signal) corresponding to a charging current during a fully charging operation is inputted by the voltage dividing resistances 92 and 93. On the other hand, a voltage corresponding to the charging current supplied to the charging current detecting resistance 3 is inverted and amplified by the operational amplifier 76 and the inverted and amplified output voltage (a charging signal) of the operational amplifier 76 is inputted to the other input terminal (−) of the operational amplifier 95 through the resistance 91. The output of the full-charge detecting circuit 90 (the output of the voltage comparator 95) is applied to the base of the transistor 7j of the relay control circuit 7 as a charging start signal or a charging stop signal to control the transistor 7j to be turned on and off. In the operation during an ordinary charging operation, when the value (the charging signal) obtained by converting the charging current to the voltage as the output of the operational amplifier 76 is lower than the reference value (the setting signal) as the voltage divided value of the resistances 92 and 93 that is applied to one input terminal of the operational amplifier 95, the transistor 7j is turned on so that the transistor 7i is turned off to interrupt the relay 4 by the relay control circuit 7. On the contrary, when the charging current is high, the transistor 7j is turned off to turn on the transistor 7i so that the relay 4 is controlled to be electrically conducted. Namely, since the lithium ion battery of the battery pack 2 has characteristics that the charging current is decreased (lowered) during the charging operation under the constant voltage control, the full-charge detecting circuit 90 compares the charging current with a reference current showing a fully charged state by the comparator 95 and decides a state when the charging current is lowered to a value not higher than the reference current as the fully charged state to control the relay 4 to be interrupted by the output of the comparator 95 and stop the charging operation.

Here, it is to be paid attention to that when the charging current has a value not higher than a prescribed charging current value (a setting current value), the full-charge detecting circuit 90 has a function for controlling the relay 4 to be interrupted. Accordingly, even when the battery pack 2 as the battery to be charged is merely inserted (connected) into the battery charger 300 to charge the battery pack, if the charging current not lower than the setting current value is not supplied, the relay 4 still maintains an interrupted state so that the output voltage of the charging power circuit 200 cannot be fed to the battery pack 2. That is, the full-charge detecting circuit 90 makes it impossible to start the relay control circuit 7. To solve this problem, according to the present invention, to the one input terminal (−) to which a signal responding to the charging current of the comparator 95 is applied, a starting voltage applying unit 94 is connected for applying a voltage (a starting signal) not lower than a setting voltage corresponding to the setting value of the charging current set to the other input terminal (+) by the resistances 92 and 93 during a transient state till a prescribed time elapses from the start of the charging operation. One example of the starting voltage applying unit 94 is formed with the condenser 94 connected between the one input terminal (−) of the comparator 95 and the collector of the transistor 7h of the relay control circuit 7. When the cell temperature detecting circuit 8 detects that the battery pack 2 to be charged is connected to the battery charger 300, since the transistor 7h of the relay control circuit 7 is turned on, the supply voltage Vcc can be inputted to the one input terminal (−) of the comparator 95 as the starting signal by the condenser 94 during the transient state until the prescribed time elapses from the start of the charging operation. As a result, the comparator 95 of the full-charge detecting circuit 90 turns off the transistor 7j of the relay circuit 7, so that the transistor 7i can be turned on to control the relay 4 to be electrically conducted (the relay is turned on) Thus, the charging operation can be started.

FIGS. 2 and 3 show operational characteristic views of the operational amplifier 95 forming the comparator of the full-charge detecting circuit 90. FIG. 3 shows characteristics from a time t0 of inserting the battery to a time t4 of the end of the charging operation by compressing a time base shown in FIG. 2. At the time t0, when the battery pack 2 is inserted into the battery charger 300, the transistor 7h of the relay control circuit 7 is turned on so that the supply voltage Vcc can be applied to the input terminal (−) of the operational amplifier 95 through the condenser 94 as the starting signal Vi. Thus, the starting signal Vi of the input terminal (−) has a value sufficiently higher than the setting signal Vr of the charging current transiently set to the other input terminal (+) during a prescribed time T1 from the time t0 to the time t2. The output voltage of the operational amplifier 95 is low as shown 2 (b). When the output of the operational amplifier 95 is low, the transistor 7j of the relay circuit 7 is turned off so that the relay 4 is turned on to start the charging operation. That is, while the prescribed time T1 elapses after the battery is inserted, the starting signal Vi larger than the setting signal Vr applied to the other input terminal (+) is applied to the one input terminal (−) of the operational amplifier 95, so that a charging start signal (a low signal) can be generated from the output terminal of the operational amplifier 95 to electrically conduct the switch unit 4 and start the charging operation.

As shown in FIG. 2(a), at the time t0, when the charging operation is started, a charging signal Vim (a characteristic curve of a dashed line) is applied to the input terminal (−) of the operational amplifier 95 through the current detecting resistance 3. The charging signal Vim itself at the time of staring the charging operation has a value lower than the setting signal Vr applied to the other input terminal (+) of the operational amplifier 95 till a time t1, however, the switch unit 4 is not turned off by the starting signal Vi.

Under a steady state from a time t2 to a time t3 after the time T1 elapses, the charging current (Vi) is applied under a constant current control. As shown in FIG. 3, when the charging state under the constant current control comes close to a fully charged state at the time t3, the constant current control is changed to the constant voltage control so that the charging current (the charging signal Vi) begins to decrease. At the time t4, when the charging current has a value lower than the prescribed full charging current (the setting signal Vr), the output voltage of the operational amplifier 95 is inverted from a low level to a high level. That is, the operational amplifier 95 outputs a charging stop signal (a high signal) to turn off the relay 4.

Now, an operation of the battery charger 300 during the charging operation will be described below.

When the battery pack 2 as the secondary cell to be charged is inserted into or connected to the battery charger 300, a value obtained by dividing the constant voltage Vcc by the combined resistance of the thermistor 2b having a resistance value responding to a cell temperature and the resistance 8h and the resistance 8g is inputted to the input terminal (+) of the operational amplifier 8k and the input terminal (−) of the operational amplifier 8l. The operational amplifier 8k sets a value obtained by dividing the constant voltage Vcc by the voltage dividing resistances 8a and 8b as a reference, and outputs a high output when the cell temperature is not higher than a prescribed temperature in a low temperature side and outputs a low output when the cell temperature is not lower than the prescribed temperature. For instance, the prescribed temperature is set to −5° C. On the other hand, the operational amplifier 8l has a value obtained by dividing the constant voltage Vcc by the voltage dividing resistances 8d and 8e as a reference, and outputs the low output when the cell temperature is not higher than a prescribed temperature in a high temperature side and outputs the high output when the cell temperature is not lower than the prescribed temperature in the high temperature side. For instance, the prescribed temperature in the high temperature side is set to 50° C.

As described above, when the voltage value of the reference input terminal side of a pair of the operational amplifiers 8k and 8l operating as the voltage comparators is set to the prescribed value, if the range of the cell temperature of the battery pack 2 is located within the range of −5° C. to 50° C., both the two input levels of the OR gate 8m are low. Thus, the output level of the OR gate 8m is low. When the cell temperature of the battery pack 2 is not higher than −5° C. or not lower than 50° C., at least one input level of the two inputs of the OR gate 8m is high. Thus, the output level of the OR gate 8m is high.

The output of the OR gate 8m is inputted to the base of the transistor 7h. Accordingly, when the low output is inputted to the base, in other words, only when the cell temperature is located within the temperature range of −5° C. to 50° C., the transistor 7h is turned on. The transistor 7h is turned on so that the voltage Vcc is transiently applied to the charging signal input terminal (−) of the operational amplifier 95 functioning as the voltage comparator as the charging start signal Vi through the condenser 94 as described above. The starting signal Vi is transiently applied for a time corresponding to the electrostatic capacity of the condenser 94.

At this time, as shown in FIG. 2(a), since the transient voltage Vcc (the staring signal) is inputted to the charging signal input terminal (−) of the operational amplifier 95 through the condenser 94 till the time t2 when the prescribed time T1 elapses from the charging start time t0 when the battery pack 2 is connected to the battery charger 300, the voltage Vi inputted to the charging signal input terminal (−) of the operational amplifier 95 is sufficiently higher than the setting voltage Vr (a voltage corresponding to an end current due to the detection of a full charged state) inputted to the setting signal input terminal (+) of the operational amplifier 95. Thus, the output level of the operational amplifier 95 shows a low output (the charging start signal) as shown in FIG. 2(b).

Before the battery pack 2 whose cell temperature is located within the range of −5° C. to 50° C. is inserted into the battery charger 300, since voltage is not applied to the charging signal input terminal (−) of the operational amplifier 95, the voltage Vi inputted to the charging signal input terminal (−) of the operational amplifier 95 is 0V. Thus, the voltage Vi is lower than the setting voltage Vr inputted to the setting signal input terminal (+) of the operational amplifier 95. As shown in FIG. 2(b), the output level of the operational amplifier 95 shows a high output. Accordingly, when the battery pack 2 having the cell temperature located within the range of −5° C. to 50° C. is inserted into the battery charger 300, an input to the base of the transistor 7j is changed to a low state from a high state to change the transistor 7j from on to off. Thus, the base of the transistor 7i is changed to a high input from a low input to turn on the transistor 7i and apply the voltage Vcc to the control coil 4b of the relay 4. Thus, the relay switch 4a is turned on.

As shown in FIG. 2(a), under the transient state T1, when the charging start signal is inputted to the charging signal input terminal (−) of the operational amplifier 95 by the condenser 94 to turn on the relay 4, the charging current begins to be supplied at the same time. The voltage drop in the charging current detecting resistance 3 is inputted to an inverting and amplifying circuit formed by the operational amplifier 76 and the resistances 71 and 72. At this time, the output (a value obtained by converting the charging current to voltage) of the inverting and amplifying circuit (the operational amplifier 76) is inputted to the charging signal input terminal (−) of the operational amplifier 95 as the voltage Vi. At this time, when the input voltage Vi (the voltage corresponding to the detected charging current value) of the charging signal input terminal (−) of the operational amplifier 95 is not lower than the setting voltage Vr (corresponding to the end current of a full charged state) inputted to the setting signal input terminal (+) of the operational amplifier 95, even after the transient voltage Vcc is completely applied with the elapse of the prescribed time T1 from the previously described charging start at the time t0, the input voltage Vi still maintains a value not lower than the setting value Vr. Thus, the output level of the operational amplifier 95 continuously maintains a low level to continuously turn on the relay 4 and continuously carry out the charging operation (see FIGS. 2(a) and 2(b).

As shown in FIG. 3(a), when the battery pack 2 is continuously charged and the cell voltage thereof reaches a constant voltage value, the constant current control is changed to a constant voltage control and the charging current falls at the time t3. Then, at the time t4, when the input voltage Vi (corresponding to a present charging current value) of the charging signal input terminal (−) of the operational amplifier 95 is not higher than the setting value Vr (corresponding to the end current for detecting the full charged state) obtained by dividing the voltage Vcc by the voltage dividing resistances 92 and 93 that is inputted to the setting signal input terminal (+) of the operational amplifier 95, the output level of the operational amplifier 95 becomes high as shown in FIG. 3(b). Thus, the transistor 7j is turned on to input (off) a low ouput to the base of the transistor 7i. Accordingly, the relay 4 is turned off to finish the charging operation.

The applying time (T1) of the charging start signal (Vi) inputted to the charging signal input terminal (−) of the operational amplifier 95 by the condenser 94 can be adjusted by the electrostatic capacity of the condenser 94 and the resistance value of the resistance 91. For instance, when the capacity value of the condenser 94 is selected to 22 μF to 47 μF, the time T1 can be set to 5 sec to 10 sec. The prescribed time T1 is of course larger than a time to the time t1 and determined by considering a time to the time t2 reaching the charging operation under the constant voltage control before the full charged state as a maximum limit.

As apparent from the above description of the embodiment, according to the battery charger, since the charging start signal and the charging stop signal for controlling the switch unit inserted into the charging power path is generated by the comparator, the full charged state can be assuredly discriminated under the constant current/constant voltage control by a relatively simple and inexpensive control circuit without using the microcomputer.

The present invention proposed by the inventor is specifically described on the basis of the embodiment, however, the present invention is not limited to the above-described embodiment, and various changes may be made within a scope without departing the gist thereof.

The invention claimed is:

1. A battery charger, comprising:
a comparator configured to compare a charging-current voltage indicative of a charging current with a setting signal and to generate a charging stop signal when the charging-current voltage signal is not higher than the setting signal; and
a relay control circuit configured to supply a signal not lower than the setting signal to a terminal of the comparator to which the charging-current voltage signal is inputted until a prescribed time elapses from a start of a charging operation.

2. The battery charger according to claim 1, wherein the setting signal is voltage corresponding to a setting charging current during a fully charging operation.

3. The battery charger according to claim 1, wherein the signal not lower than the setting signal is a starting voltage for starting a charging operation.

4. The battery charger according to claim 1, wherein the comparator is formed with an operational amplifier.

5. A battery charger comprising:
a rectifying and smoothing circuit configured to rectify an AC power and to supply a DC power;
a charging power circuit configured to charge a secondary battery, with the DC power, through a switch unit;
a comparator configured to compare a charging-current voltage indicative of a charging current with a setting signal and to generate a charging stop signal when the charging-current voltage signal is not higher than the setting signal; and
a relay control circuit configured to supply a starting signal not lower than the setting signal to a terminal of the comparator to which the charging-current voltage signal is inputted until a prescribed time elapses from a start of a charging operation, so that during the prescribed time, the comparator does not output the charging stop signal, wherein the switch unit is configured to be turned off in response to the charging stop signal.

6. The battery charger according to claim 5, wherein the setting signal indicates a voltage corresponding to the setting current value during the fully charging operation.

7. The battery charger according to claim 5, comprising:
a cell temperature detecting unit for detecting the cell temperature of the secondary battery to be charged,
wherein when the cell temperature detected by the cell temperature detecting unit is within a prescribed temperature range, the relay circuit supplies the starting signal to the comparator for a prescribed time after the secondary battery to be charged is inserted into the battery charger.

8. The battery charger according to claim 7, wherein the secondary cell to be charged is a lithium battery charged by a constant current/constant voltage control.

9. The battery charger according to claim 5, wherein the relay circuit is connected to a voltage source having a constant voltage value.

10. The battery charger according to claim 9, wherein a condenser is disposed between the relay circuit and the comparator so that the starting signal is supplied to the comparator through the condenser.

11. The battery charger according to claim 5, wherein the switch unit is formed with a relay switch and a switch control circuit including a control coil of the relay switch is controlled by the charging stop signal.

12. The battery charger according to claim 5, further comprising:
a constant current control circuit configured to charge the secondary battery with constant current charging; and
a constant voltage control circuit configured to charge the secondary battery with constant voltage charging,
wherein the comparator configured to generate the charging stop signal when the secondary battery is charged by the constant voltage charging.

* * * * *

UNITED STATES PATENT AND TRADEMARK OFFICE
CERTIFICATE OF CORRECTION

PATENT NO. : 8,344,696 B2  
APPLICATION NO. : 12/281233  
DATED : January 1, 2013  
INVENTOR(S) : Aradachi et al.

Page 1 of 1

It is certified that error appears in the above-identified patent and that said Letters Patent is hereby corrected as shown below:

On the Title Page of the Patent, in Item "(73) Assignee: HITACHI KOKO CO., LTD," the Assignee name is spelled incorrectly. The Assignee name should read, HITACHI KOKI CO., LTD..

Signed and Sealed this
Second Day of July, 2013

Teresa Stanek Rea
*Acting Director of the United States Patent and Trademark Office*